United States Patent [19]

Chandler et al.

[11] 4,335,235
[45] Jun. 15, 1982

[54] CRYSTALLINE CO-POLYBENZYLS PREPARATION

[75] Inventors: John E. Chandler, Stamford, Conn.; Robert W. Lenz, Amherst, Mass.

[73] Assignee: Exxon Research & Engineering Co., Florham Park, N.J.

[21] Appl. No.: 198,402

[22] Filed: Oct. 20, 1980

Related U.S. Application Data

[62] Division of Ser. No. 25,225, Mar. 29, 1979, Pat. No. 4,255,562.

[51] Int. Cl.³ .............................................. C08G 61/02
[52] U.S. Cl. .................................... 528/397; 528/396
[58] Field of Search ................................. 528/397, 396

[56] References Cited

U.S. PATENT DOCUMENTS

| | | | |
|---|---|---|---|
| 2,241,488 | 5/1941 | Sparks et al. | 528/397 |
| 3,060,122 | 10/1962 | Wilgus | 528/397 |
| 3,322,841 | 5/1967 | Geering | 528/397 |
| 3,346,514 | 10/1967 | Isaacson et al. | 528/397 |
| 3,418,259 | 12/1968 | Kennedy et al. | 528/397 |

OTHER PUBLICATIONS

Chemical Abstracts, vol. 59 (1963), 7661a.
Chemical Abstracts, vol. 57 (1962), 15338c.
Journal of Polymer Science, Haas et al., vol. 15 (1955), pp. 503–514.

*Primary Examiner*—Harold D. Anderson
*Attorney, Agent, or Firm*—M. B. Kurtzman

[57] ABSTRACT

Crystalline co-polybenzyls are prepared by the polymerization of 2,5-dimethylbenzyl chloride with a benzyl halide of the same series.

1 Claim, No Drawings

CRYSTALLINE CO-POLYBENZYLS PREPARATION

This is a division of application Ser. No. 25,225, filed Mar. 29, 1979, now Pat. No. 4,255,562.

BACKGROUND OF THE INVENTION

1. Field of the Invention

This invention relates to the formation of crystalline co-polybenzyls. In particular, this invention relates to the copolymerization of 2,5-dimethylbenzyl halide with another alkyl ring-substituted benzyl halide of the same series in the presence of a Ziegler-type catalyst. The invention further relates to the process of polymerizing benzyl halides to highly crystalline co-polybenzyl halides.

2. Description of the Prior Art

The condensation polymerization of benzyl halides as well as alkyl ring-substituted benzyl halides with acidic catalysts is well known in the art. Prior methods for the formation of polybenzyls have involved the use of Friedel-Crafts catalysts. Polybenzyls formed with Friedel-Crafts catalysts, as reported in U.S. Pat. No. 2,241,488 and in the literature, H. C. Haas et al, J. Poly. Sci., XV, 503 (1955), tend to be resinous solids having softening points over the range of about 75° to 80° C. and melting at about 95° C. In addition to the use of classical Friedel-Crafts catalysts, polybenzyls have been prepared with various types of alkyl-metal compounds, see, for example, Chemical Abstracts 59, 7661a (1963) and 57, 15338c (1962).

In U.S. Pat. No. 3,418,259 of Kennedy et al, issued Dec. 24, 1968 there is disclosed a method of polymerizing crystalline homopolybenzyls in the presence of Friedel-Crafts catalysts and for the preparation of amorphous copolymers of benzyl halides and a $C_3$–$C_8$ α-monoolefin.

In U.S. Pat. No. 3,346,514 of Isaacson et al issued Oct. 10, 1967 there is disclosed a method of polymerizing crystalline homopolybenzyls in the presence of a Ziegler-type catalyst. Heretofore crystalline copolybenzyls have not been known.

SUMMARY OF THE INVENTION

In accordance with this invention, it has been unexpectedly discovered that when two different alkyl ring-substituted benzyl halides are polymerized in the presence of a Ziegler-type catalyst a substantially high molecular weight highly crystalline random copolybenzyl is obtained. It has further been discovered that by employing a solvent such as 1,1,2,2-tetrachloroethane the reaction temperatures during the polymerization step can be maintained at temperatures of between room temperature and 100° C.

Accordingly, it is an object of this invention to provide highly crystalline co-polybenzyls. It is yet another object of this invention to provide a process for the polymerization of two different alkyl ring-substituted benzyl halides of the same series to a highly crystalline co-polybenzyl. It is yet another object of this invention to provide a method for the polymerization of two different alkyl ring-substituted polybenzyls of the same series at reaction temperatures of from about room temperature to about 100° C.

DESCRIPTION OF THE PREFERRED EMBODIMENTS

According to the present invention, there is provided high molecular weight, linear highly crystalline co-polybenzyls represented by the structural formula:

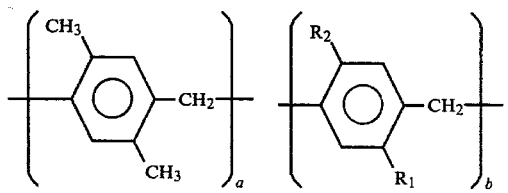

wherein $R_1$ and $R_2$ are the same or different $C_1$–$C_6$ alkyl groups and when $R_1$ or $R_2$ is methyl, the other of $R_1$ or $R_2$ is a $C_2$–$C_6$ alkyl group, a is 98.9 to about 82 mol percent and b is 1.1 to about 18 mol percent. The alkyl groups that may be substituted on the benzyl ring are methyl, ethyl, propyl, isopropyl, butyl, secondary butyl, isobutyl, pentyl, hexyl, and the like. Preferred alkyl groups which can be substituted on the benzyl ring are alkyl groups having from 1 to 3 carbon atoms and most preferred is wherein $R_1$ is methyl and $R_2$ is isopropyl.

The ratios of 2,5-dimethylbenzyl to comonomer present in the polymer can be as mentioned above anywhere from 98.9% to about 82 mol % of 2,5-dimethylbenzyl, the remaining being the comonomer. Preferably, 2,5-dimethylbenzyl will be present in an amount of about 82.5 mol % whereas comonomer will be present in an amount of approximately 17.5%.

The 2,5-dialkylbenzyl halide comonomers are represented by the structural formula

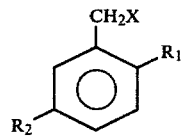

wherein $R_1$ and $R_2$ are as defined above, X is a halogen atom, and when $R_1$ or $R_2$ is methyl, the other of $R_1$ or $R_2$ is a $C_2$–$C_6$ alkyl group.

Illustrative of the 2,5-dialkylbenzyl halides which may be employed as comonomers are: 2-methyl-5-ethylbenzyl halide, 2-methyl-5-isopropylbenzyl halide, 2-methyl-5-propylbenzyl halide, 2-methyl-5-butylbenzyl halide, 2-methyl-5-pentylbenzyl halide, 2-ethyl-5-hexylbenzyl halide, 2-propyl-5-ethylbenzyl halide, 2-propyl-5-methylbenzyl halide, 2-propyl-5-isopropylbenzyl halide, 2-propyl-5-butylbenzyl halide, 2-propyl-5-pentylbenzyl halide, 2-butyl-5-methylbenzyl halide, 2-butyl-5-ethylbenzyl halide, 2-butyl-5-butylbenzyl halide, 2-butyl-5-pentylbenzyl halide, 2-butyl-5-hexylbenzyl halide, and the like. The most preferred is 2-methyl-5-isopropylbenzyl halide. The halide atoms which can be present in the monomers are chloride, bromide, iodide, or fluoride and most preferably chloride. The most preferred comonomer to be copolymerized with 2,5-dimethylbenzyl chloride is 2-methyl-5-isopropylbenzyl chloride.

The linear, random crystalline copolymers of this invention are readily polymerized in the presence of a Ziegler-type catalyst comprising one of a Group IVB to VIB and Group VIII transition metal compound and a Group I to III organo metal reducing agent. The catalyst employed therefore in the copolymerization of the monomers to the co-polybenzyls of this invention comprises at least two components, namely, a catalyst and a co-catalyst. The catalyst is a reducable heavy transition metal compound such as a halide or oxyhalide of a metal of Group IVB through VIB and Group VIII of the periodic system, e.g., of titanium, zirconium, vanadium, etc.

Preferably, the catalyst is selected from the group consisting of titanium and vanadium halides and oxyhalides. Particularly preferred catalyst compounds are titanium tetrachloride, titanium trichloride, vanadium tetrachloride, and vanadium trichloride.

The co-catalysts employed in this invention comprise one or more Group I-III organo metal compounds, such as alkylaluminum compounds, lithium alkyls, lithium aluminum compounds, alkyl magnesium halides, zinc alkyl, etc. Particularly valuable as the reducing component of the catalyst system are the lower alkylaluminum compounds, especially trialkylauminum compounds having from 2 to 6 carbon atoms per alkyl group, such as triethylaluminum, tripropylaluminum, triisobutylaluminum and the like, and the lower dialkylaluminum compounds also having from 2 to 6 carbon atoms per alkyl group, such as diethylaluminum halides, e.g., diethylaluminum chloride, dipropylaluminum chloride, diisopropylaluminum chloride, and the like. The lower monoalkylaluminum halides, e.g., ethylaluminum dichloride, can also be used as well as mixtures of the above-named compounds. Particularly preferred herein as the cocatalyst components are triethylaluminum and diethylaluminum chloride.

The components of the catalyst system, i.e., the catalyst and the co-catalyst, can be mixed with an inert organic diluent prior to their use in the polymerization system. Alternatively, the components of the catalyst system can be added to the reactants in the presence or absence of any diluents.

The molar ratio of the co-catalyst (the reducing component of the catalyst) to the transition metal compound should not exceed 1. It has been found that if the molar ratio exceeds 1, the final polymer product contains a very high degree of branching and, as a result, low melting polymers as opposed to the high melting polymers of the present invention will be obtained. The total amount of catalyst employed in the polymerization reaction varies with the choice of components of the catalyst system and with the type of comonomer to be polymerized with the 2,5-dimethylbenzyl halide, but is generally in the range of from about 0.01 to 0.04 mols of $TiCl_4$ per mol of monomer, preferably 0.02 to 0.03.

The conditions at which the polymerization reaction is carried out can vary over a wide range. Generally, temperatures ranging from $-30°$ to $100°$ C. can be used; however, in accordance with this invention, temperatures ranging from room temperature to about $100°$ C. are preferred. Pressures ranging from 0.2 to 1,000 psig can be employed in the polymerization reaction; however, pressures in the range of from about 1 atmosphere to about 10 atmospheres are more commonly utilized and most preferably the reactions are run at about atmospheric pressure and initially at about room temperature and then raised to about $65°$ C. to complete the reaction. The reaction times employed in the formation of the copolymers of this invention depend in general upon the temperature used. Reaction times ranging from 1 minute to 100 hours can be employed; however, it is more usual to use reaction times ranging from about 17 to 100 hours.

The solvents or diluents employed in making the polymers of the present invention should be liquids at the conditions of temperature and pressure employed during the polymerization reaction. Solvents suitable for use in the polymerization reaction include $C_3-C_{10}$ saturated aliphatic hydrocarbons, such as pentane, hexane, iso-octane, and the like; saturated cycloaliphatic hydrocarbons, such as cyclopentane, cyclohexane can also be used. Preferably the solvents of greater polarity such as methyl chloride, methylene dichloride, and ethylene dichloride can be used as the reaction diluent. The most preferred solvent to be employed in the accordance with this invention is 1,1,2,2-tetrachloroethane. In accordance with the most preferred embodiment of this invention, by using the 1,1,2,2-tetrachloroethane polymerization temperatures can range from between room temperature to about $200°$ C.

The reaction vessel employed for the polymerization can be constructed of any material that is inert to the reactants used, and is capable of withstanding the operating pressures. Reactors made of glass, stainless steel and glass lined steel may be employed.

In a typical polymerization procedure, a reaction vessel is charged with 1,1,2,2-tetrachloroethane and the monomers to be copolymerized such as, for example, 2,5-dimethylbenzyl chloride and 2-methyl-5-isopropylbenzyl chloride. A catalyst solution made up of an alkylaluminum compound and a transition metal compound wherein the molar ratio of aluminum compound to transition metal compound does not exceed 1, is introduced into the diluent-comonomer mixture. Agitation of the mixture is then commenced, accompanied by the formation of an orange to blood-red precipitate. The total mixture is maintained at a temperature in the range of about room temperature for approximately 1 hour, and then the temperature can be increased to approximately to $65°$ C. while the reaction continues for approximately 40 to 90 hours more before terminating the reaction by pouring the reaction mixtures into a small quantity of a lower alkanol such as methanol. The copolymer product is recovered from the reaction mixtures by use of precipitation from lower alkanols or solvent evaporation.

The copolymers, as prepared by the process of the present invention, are substantially linear crystalline hydrocarbon materials. The copolymers produced have only a limited solubility in benzene although they are completely soluble in hexachlorobutadiene. The crystalline melting point of the polymers is in excess of $150°$ C. and generally within the range of $200°$ to $250°$ C. The polymers possess excellent ultraviolet, heat and oxidation stability. The present polymers can be employed in several general thermoplastic applications and as such the polymers can be used in the manufacture of conduits, hoses and pipes, wire and cable coatings, seals, mold and mechanical goods, tank and pipe lining, and other articles of manufacture. The invention and its advantages will be better understood by reference to the following example.

EXAMPLE 1

10.8 mmols of 2,5-dimethylbenzyl chloride was made up in 25 ml of 1,1,2,2-tetrachloroethane. 2.3 mmols of 2-methyl-5-isopropylbenzyl chloride was made up in 25 ml of the same solvent. The benzyl halide solutions were mixed together under dry nitrogen. 20 ml of the mixed solutions was injected directly into a 300 ml flask containing 100 ml of dry 1,1,2,2-tetrachloroethane, 0.25 ml of titanium tetrachloride and 1.2 ml of diethylaluminum chloride. The reaction flask was kept under dry nitrogen. Immediate color change occurred as well as increased acidity of the nitrogen stream as the polymerization continued. Termination of the copolymerization reaction was accomplished by pouring the reaction mixtures into 2 l stirred methanol. A precipitate immediately appeared and was filtered, washed thoroughly and dried under a vacuum at 60° C. Two more runs were performed for a period of different times and temperatures. A summary of the conditions and results appears in Table I.

Further advantages of this invention will be apparent to those skilled in the art. Polymers that exhibit high melting characteristics can be prepared by the process of the present invention. It is to be understood that this invention is not limited to the specific example set forth herein which has been offered merely as illustration and that modification may be made without departing from the spirit and scope of the appended claims.

TABLE I

| $DMB^a$ | $MIB^b$ | Time hours | Temp., °C. | Yield % | Inherent Viscosity | Polymer Melt pt., °C. | Mol % DMB-MIB in Polymer |
|---|---|---|---|---|---|---|---|
| 10.8 | 2.3 | 48 | 65 | 98 | 0.22 | 253 | 90.4/9.6 |
| 10.8 | 2.3 | 96 | 65 | 100 | 0.18 | 227 | 93.0/7.0 |
| 10.8 | 2.3 | 17 | 65 | 91 | 0.10 | 207 | 98.9/1.1 |

$^a$2,5-dimethylbenzyl chloride
$^b$2-methyl-5-isopropylbenzyl chloride

What is claimed is:

1. A process of preparing crystalline polybenzyls represented by the structural formula:

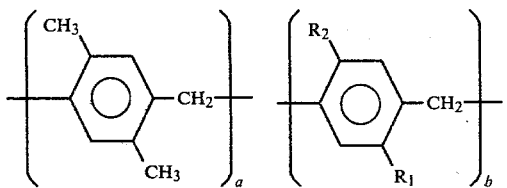

wherein $R_1$ and $R_2$ are the same or different $C_1$–$C_6$ alkyl groups, when one of $R_1$ or $R_2$ is methyl the other of $R_1$ and $R_2$ is a $C_2$–$C_6$ alkyl group, a is 98.9% to about 82 mol percent, b is 1.1 to about 18 mol percent, comprising copolymerizing 2,5-dimethylbenzyl halide with a benzyl halide represented by the structural formula:

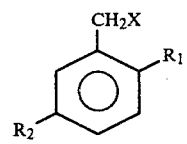

wherein $R_1$ and $R_2$ are as above and X is a halogen atom, in the presence of a catalyst comprising an alkylaluminum compound and a transition metal halide selected from the group consisting of titanium halides and oxyhalides and vanadium halides and oxyhalides, the molar ratio of alkylaluminum compound to transition metal halide not exceeding 1.

* * * * *